(12) United States Patent
Kilaru et al.

(10) Patent No.: US 10,382,807 B2
(45) Date of Patent: Aug. 13, 2019

(54) TRACKING USER INTERACTION FROM A RECEIVING DEVICE

(71) Applicant: DISH Technologies L.L.C., Englewood, CO (US)

(72) Inventors: Kranti Kilaru, Castle Rock, CO (US); David A. Kummer, Highlands Ranch, CO (US); Henry Gregg Martch, Parker, CO (US); Jason Anguiano, Castle Rock, CO (US); S. Craig Hemenway, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/655,266

(22) Filed: Jul. 20, 2017

(65) Prior Publication Data
US 2018/0007415 A1    Jan. 4, 2018

Related U.S. Application Data

(63) Continuation of application No. 13/302,717, filed on Nov. 22, 2011, now Pat. No. 9,781,465.
(Continued)

(51) Int. Cl.
*H04H 60/32* (2008.01)
*H04N 21/422* (2011.01)
(Continued)

(52) U.S. Cl.
CPC ...... *H04N 21/42202* (2013.01); *H04H 60/33* (2013.01); *H04H 60/59* (2013.01);
(Continued)

(58) Field of Classification Search
CPC ....... H04N 21/42202; H04N 21/25866; H04N 21/44222; H04N 21/4758; H04N 21/4882; H04N 21/6582; H04N 21/84
See application file for complete search history.

(56) References Cited

U.S. PATENT DOCUMENTS

| | | |
|---|---|---|
| 4,809,325 A | 2/1989 | Hayashi et al. |
| 4,837,414 A | 6/1989 | Edamula |

(Continued)

FOREIGN PATENT DOCUMENTS

| | | |
|---|---|---|
| CA | 2 634 951 A1 | 1/2010 |
| CA | 2 760 146 C | 11/2010 |

(Continued)

OTHER PUBLICATIONS

Office Action for CA 2,818,604, all pages.
(Continued)

*Primary Examiner* — Yassin Alata
(74) *Attorney, Agent, or Firm* — Kilpatrick Townsend & Stockton LLP

(57) ABSTRACT

Measuring and tracking user interaction with a television receiver, such as a set top box or cable box. The television receiver may create and display a matrix code that includes temporal information, user identification information, geographic information, and/or a user selection. The matrix code may be captured by a matrix reading device and transmitted to a monitoring entity. Optionally, the matrix reading device may decode the matrix code and transmit associated data to the monitoring entity. The monitoring entity may use the code or data to track and distinguish between user interactions at different points in time.

20 Claims, 3 Drawing Sheets

Related U.S. Application Data

(60) Provisional application No. 61/417,076, filed on Nov. 24, 2010.

(51) Int. Cl.
*H04N 21/258* (2011.01)
*H04N 21/442* (2011.01)
*H04N 21/475* (2011.01)
*H04N 21/488* (2011.01)
*H04N 21/658* (2011.01)
*H04N 21/84* (2011.01)
*H04H 60/33* (2008.01)
*H04H 60/59* (2008.01)
*H04H 20/28* (2008.01)
*H04H 60/45* (2008.01)

(52) U.S. Cl.
CPC . *H04N 21/25866* (2013.01); *H04N 21/44222* (2013.01); *H04N 21/4758* (2013.01); *H04N 21/4882* (2013.01); *H04N 21/6582* (2013.01); *H04N 21/84* (2013.01); *H04H 20/28* (2013.01); *H04H 60/45* (2013.01)

(56) References Cited

U.S. PATENT DOCUMENTS

| | | |
|---|---|---|
| 5,500,681 A | 3/1996 | Jones |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,929,849 A | 7/1999 | Kikinis |
| 5,959,285 A | 9/1999 | Schuessler |
| 5,963,265 A | 10/1999 | Bae et al. |
| 5,978,855 A | 11/1999 | Metz et al. |
| 6,006,990 A | 12/1999 | Ye et al. |
| 6,058,238 A | 5/2000 | Ng |
| 6,263,502 B1 | 7/2001 | Morrison et al. |
| 6,438,751 B1 | 8/2002 | Voyticky et al. |
| 6,512,919 B2 | 1/2003 | Ogasawara |
| 6,556,273 B1 | 4/2003 | Wheeler et al. |
| 6,704,929 B1 | 3/2004 | Ozer et al. |
| 6,766,956 B1 | 7/2004 | Boylan et al. |
| 6,983,304 B2 | 1/2006 | Sato |
| 7,046,161 B2 | 5/2006 | Hayes |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,373,652 B1 | 5/2008 | Bayrakeri et al. |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,587,601 B2 | 9/2009 | Levy et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,818,675 B2 | 10/2010 | Maruyama et al. |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,327,403 B1 | 12/2012 | Chilvers et al. |
| 8,364,018 B2 | 1/2013 | McArdle |
| 8,380,993 B2 | 2/2013 | Chen et al. |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 8,511,540 B2 | 8/2013 | Anguiano |
| 8,534,540 B2 | 9/2013 | Gratton et al. |
| 8,550,334 B2 | 10/2013 | Gratton et al. |
| 8,553,146 B2 | 10/2013 | Kennedy |
| 8,746,554 B2 | 6/2014 | Gomez et al. |
| 8,786,410 B2 | 7/2014 | Beals et al. |
| 8,827,150 B2 | 9/2014 | Gratton et al. |
| 8,833,640 B2 | 9/2014 | Martch et al. |
| 8,856,853 B2 | 10/2014 | Casagrande et al. |
| 8,875,173 B2 | 10/2014 | Kilaru et al. |
| 8,886,172 B2 | 11/2014 | Gomez |
| 8,931,031 B2 | 1/2015 | Schaefer |
| 9,092,830 B2 | 7/2015 | Gomez et al. |
| 9,148,686 B2 | 9/2015 | Gerhards et al. |
| 9,280,515 B2 | 3/2016 | Gaede et al. |
| 9,329,966 B2 | 5/2016 | Dugan et al. |
| 9,367,669 B2 | 6/2016 | Gratton |
| 9,571,888 B2 | 2/2017 | Casagrande et al. |
| 9,596,500 B2 | 3/2017 | Gomez et al. |
| 9,652,108 B2 | 5/2017 | Mountain |
| 9,736,469 B2 | 8/2017 | Schaefer et al. |
| 9,781,465 B2 | 10/2017 | Kilaru et al. |
| 9,792,612 B2 | 10/2017 | Dugan et al. |
| 10,015,483 B2 | 7/2018 | Schaefer et al. |
| 2001/0037297 A1 | 11/2001 | McNair |
| 2001/0052133 A1 | 12/2001 | Pack et al. |
| 2002/0011521 A1 | 1/2002 | Lahey et al. |
| 2002/0027612 A1 | 3/2002 | Brill et al. |
| 2002/0049980 A1 | 4/2002 | Hoang |
| 2002/0065728 A1 | 5/2002 | Ogasawara |
| 2002/0082931 A1 | 6/2002 | Siegel et al. |
| 2002/0112250 A1 | 8/2002 | Koplar et al. |
| 2002/0195495 A1 | 12/2002 | Melick et al. |
| 2003/0018711 A1 | 1/2003 | Imanishi |
| 2003/0050854 A1 | 3/2003 | Showghi et al. |
| 2003/0077065 A1 | 4/2003 | Scholten et al. |
| 2003/0112974 A1 | 6/2003 | Levy |
| 2003/0121978 A1 | 7/2003 | Rubin et al. |
| 2003/0125092 A1 | 7/2003 | Burnhouse et al. |
| 2003/0151562 A1 | 8/2003 | Kulas |
| 2003/0172374 A1 | 9/2003 | Vinson et al. |
| 2004/0005900 A1 | 1/2004 | Zilliacus |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2004/0046790 A1 | 3/2004 | Agarwal et al. |
| 2004/0049672 A1 | 3/2004 | Nollet et al. |
| 2004/0133907 A1 | 7/2004 | Rodriguez et al. |
| 2004/0226042 A1 | 11/2004 | Ellis |
| 2004/0260850 A1 | 12/2004 | Yu et al. |
| 2005/0009564 A1 | 1/2005 | Hayaashi et al. |
| 2005/0011958 A1 | 1/2005 | Fukasawa et al. |
| 2005/0015800 A1 | 1/2005 | Holcomb |
| 2005/0015815 A1 | 1/2005 | Shoff et al. |
| 2005/0055281 A1 | 3/2005 | Williams |
| 2005/0059339 A1 | 3/2005 | Honda et al. |
| 2005/0097618 A1 | 5/2005 | Arling et al. |
| 2005/0107135 A1 | 5/2005 | Deeds et al. |
| 2005/0125301 A1 | 6/2005 | Muni |
| 2005/0149967 A1 | 7/2005 | Hanley et al. |
| 2005/0163483 A1 | 7/2005 | Rassool |
| 2005/0180804 A1 | 8/2005 | Andrew et al. |
| 2005/0203854 A1 | 9/2005 | Das et al. |
| 2005/0258250 A1 | 11/2005 | Melick et al. |
| 2005/0262217 A1 | 11/2005 | Nonaka et al. |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0065733 A1 | 3/2006 | Lee et al. |
| 2006/0071076 A1 | 4/2006 | Tamayama |
| 2006/0079247 A1 | 4/2006 | Ritter |
| 2006/0086796 A1 | 4/2006 | Onogi |

(56) References Cited

U.S. PATENT DOCUMENTS

| | | |
|---|---|---|
| 2006/0090179 A1 | 4/2006 | Hsu et al. |
| 2006/0095286 A1 | 5/2006 | Kimura |
| 2006/0124742 A1 | 6/2006 | Rines et al. |
| 2006/0174317 A1 | 8/2006 | Onomatsu et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0008344 A1 | 1/2007 | Medina |
| 2007/0011709 A1 | 1/2007 | Katz et al. |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernathy et al. |
| 2007/0159522 A1 | 7/2007 | Neven |
| 2007/0174198 A1 | 7/2007 | Kasahara |
| 2007/0192723 A1 | 8/2007 | Anzelde et al. |
| 2007/0200335 A1 | 8/2007 | Tushcel |
| 2007/0205596 A1 | 9/2007 | Mizuno et al. |
| 2007/0206020 A1 | 9/2007 | Duffield et al. |
| 2007/0256118 A1 | 11/2007 | Nomura et al. |
| 2007/0288594 A1 | 12/2007 | Philyaw et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0141321 A1 | 6/2008 | Kubat et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0263621 A1 | 10/2008 | Austerlitz et al. |
| 2008/0267537 A1 | 10/2008 | Thuries |
| 2008/0281624 A1 | 11/2008 | Shibata |
| 2008/0285944 A1 | 11/2008 | Tsunokawa |
| 2008/0288460 A1 | 11/2008 | Poniatowski et al. |
| 2008/0288600 A1 | 11/2008 | Clark |
| 2008/0307348 A1 | 12/2008 | Jones et al. |
| 2009/0029725 A1* | 1/2009 | Gerard Kindberg ... G06Q 30/02 455/466 |
| 2009/0031071 A1 | 1/2009 | Chiu |
| 2009/0031373 A1 | 1/2009 | Hogyoku |
| 2009/0070699 A1 | 3/2009 | Birkill et al. |
| 2009/0083808 A1 | 3/2009 | Morrison |
| 2009/0088213 A1 | 4/2009 | Rofougaran |
| 2009/0094546 A1 | 4/2009 | Anzelde et al. |
| 2009/0108057 A1 | 4/2009 | Mu et al. |
| 2009/0113334 A1 | 4/2009 | Chakra et al. |
| 2009/0116074 A1 | 5/2009 | Wilsher |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0196456 A1 | 8/2009 | Bisti et al. |
| 2009/0200367 A1 | 8/2009 | Arnouse |
| 2009/0212112 A1 | 8/2009 | Li et al. |
| 2009/0212113 A1 | 8/2009 | Chiu et al. |
| 2009/0234570 A1 | 9/2009 | Sever |
| 2009/0250512 A1 | 10/2009 | Deck et al. |
| 2009/0254954 A1 | 10/2009 | Jeong |
| 2009/0293088 A1 | 11/2009 | Mukerji et al. |
| 2009/0293110 A1 | 11/2009 | Koga |
| 2009/0294538 A1 | 12/2009 | Wihlborg et al. |
| 2009/0300673 A1 | 12/2009 | Bachet et al. |
| 2009/0303036 A1 | 12/2009 | Sahuguet |
| 2009/0307232 A1 | 12/2009 | Hall |
| 2009/0307719 A1 | 12/2009 | Clark et al. |
| 2009/0312105 A1 | 12/2009 | Koplar |
| 2009/0320066 A1 | 12/2009 | Soldan et al. |
| 2010/0001072 A1 | 1/2010 | Onogi |
| 2010/0004984 A1 | 1/2010 | Beyabani |
| 2010/0017457 A1 | 1/2010 | Jumpertz et al. |
| 2010/0020970 A1 | 1/2010 | Liu et al. |
| 2010/0026721 A1 | 2/2010 | Park et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0058312 A1 | 3/2010 | Morohoshi |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131373 A1 | 5/2010 | Kubasov |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0138344 A1 | 6/2010 | Wong et al. |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0169935 A1 | 7/2010 | Abbruzzese |
| 2010/0186025 A1 | 7/2010 | Thomas et al. |
| 2010/0188514 A1* | 7/2010 | Sato ............ G06K 9/3208 348/207.1 |
| 2010/0201894 A1 | 8/2010 | Nakayama et al. |
| 2010/0205628 A1 | 8/2010 | Davis et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0272420 A1 | 10/2010 | Soohoo et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007630 A1 | 1/2011 | Almhana et al. |
| 2011/0030068 A1 | 2/2011 | Imai |
| 2011/0039573 A1 | 2/2011 | Hardie |
| 2011/0058516 A1 | 3/2011 | Small et al. |
| 2011/0061003 A1 | 3/2011 | Miyazawa et al. |
| 2011/0065451 A1 | 3/2011 | Danado et al. |
| 2011/0083154 A1 | 4/2011 | Boersma |
| 2011/0087539 A1 | 4/2011 | Rubinstein et al. |
| 2011/0107374 A1 | 5/2011 | Roberts et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0296046 A1 | 12/2011 | Arya et al. |
| 2011/0314485 A1 | 12/2011 | Abed |
| 2011/0321114 A1 | 12/2011 | Newell |
| 2012/0075529 A1 | 3/2012 | Wong et al. |
| 2012/0084206 A1 | 4/2012 | Mehew et al. |
| 2012/0096499 A1 | 4/2012 | Dasher et al. |
| 2012/0117193 A1 | 5/2012 | Phillips et al. |
| 2012/0117232 A1 | 5/2012 | Brown et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |

(56) References Cited

U.S. PATENT DOCUMENTS

| | | |
|---|---|---|
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2012/0311623 A1 | 12/2012 | Davis et al. |
| 2013/0068838 A1 | 3/2013 | Gomez et al. |
| 2013/0239157 A1 | 9/2013 | Gaede et al. |
| 2014/0046661 A1 | 2/2014 | Bruner |
| 2014/0076963 A1 | 3/2014 | Gratton et al. |
| 2014/0158762 A1 | 6/2014 | Gomez et al. |
| 2016/0066050 A1 | 3/2016 | Gerhards et al. |
| 2017/0366806 A1 | 12/2017 | Schaefer et al. |

FOREIGN PATENT DOCUMENTS

| | | |
|---|---|---|
| CN | 1352765 A | 6/2002 |
| CN | 1571503 A | 1/2005 |
| CN | 1636371 A | 7/2005 |
| CN | 1675930 A | 9/2005 |
| CN | 1839398 A | 9/2006 |
| CN | 101 227 581 A | 7/2008 |
| CN | 101253504 A | 8/2008 |
| CN | 101 355 685 A | 1/2009 |
| CN | 101 409 027 A | 4/2009 |
| CN | 101 873 467 A | 10/2010 |
| CN | 101 894 113 A | 11/2010 |
| CN | 101 895 722 A | 11/2010 |
| CN | 103221963 A | 7/2013 |
| DE | 23 36 711 A1 | 2/1975 |
| DE | 10 2007 038 810 A1 | 2/2009 |
| EP | 1 021 035 A1 | 7/2000 |
| EP | 1 383 071 A2 | 1/2004 |
| EP | 1 555 808 A1 | 7/2005 |
| EP | 1 724 695 A1 | 11/2006 |
| EP | 1 757 222 A1 | 2/2007 |
| EP | 1 768 400 A2 | 3/2007 |
| EP | 1 831 747 A1 | 9/2007 |
| EP | 2 079 051 A1 | 7/2009 |
| EP | 2 131 289 A1 | 12/2009 |
| EP | 2 439 936 A2 | 4/2012 |
| EP | 2 643 769 A1 | 10/2013 |
| EP | 2 643 793 A1 | 10/2013 |
| FR | 2 565 748 A1 | 12/1985 |
| FR | 2 929 467 A1 | 10/2009 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| IN | 4698/CHENP/2013 A | 6/2016 |
| IN | 7734/CHENP/2013 A | 6/2016 |
| JP | 2000-222116 A | 8/2000 |
| JP | 2002-215768 A | 8/2002 |
| JP | 3929450 | 6/2007 |
| JP | 2007-213548 A | 8/2007 |
| JP | 2008-276716 | 11/2008 |
| JP | 2009-140204 A | 6/2009 |
| JP | 2008-244556 A | 10/2009 |
| KR | 2004 0087776 A | 10/2004 |
| TW | 299433 | 3/1997 |
| TW | 200915193 A1 | 4/2009 |
| TW | 200926075 A | 6/2009 |
| TW | 201032139 A | 9/2010 |
| TW | 201038061 | 10/2010 |
| TW | 201043039 A1 | 12/2010 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2004/019442 A2 | 3/2004 |
| WO | 2005/109338 A1 | 11/2005 |
| WO | 2007/009005 A1 | 1/2007 |
| WO | 2009/056897 A1 | 1/2007 |
| WO | 2009/057651 A1 | 5/2009 |
| WO | 2009/116954 A2 | 9/2009 |
| WO | 2009/144536 A1 | 12/2009 |
| WO | 2010/149161 A1 | 12/2010 |
| WO | 2011/009055 A2 | 1/2011 |
| WO | 2012/071176 A1 | 5/2012 |
| WO | 2012071174 A1 | 5/2012 |
| WO | 2012/074705 A1 | 6/2012 |

OTHER PUBLICATIONS

Third Office Action issued by State Intellectual Property Office (SIPO) for CN 201180056249.9 dated Aug. 21, 2017, all pages.
U.S. Appl. No. 15/595,621, filed May 15, 2017 Non-Final Rejection dated Oct. 18, 2017, all pages.
European Search Report for EP 11 846 858.6 dated Jun. 12, 2017, all pages.
Jung, Eui-Hyun et al., "A Robust Digital Watermarking System Adopting 2D Barcode against Digital Piracy on P2P Network," IJCSNS International Journal of Computer Science and Network Security, vol. 6, No. 10, Oct. 2006, 6 pages.
"Android App Reviews & Showcase Just a Tapp Away," Android Tapp, 10pp. Found online at http://www.androidtapp.com/download-the-weather-channel-android-app-from-your-tv/, Oct. 22, 2010.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
"FOX TV Uses QR Codes," 2D Barcode Strategy, Sep. 2010, 6 pp. Found online at http://www.2dbarcodestrategy.com/2010/09/fox-tv-uses-qr-codes.html, Oct. 22, 2010.
"FOX's Fringe Uses QR Code," 2D Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local-QR Barcode Technology, 2 pp. Found online at http://www.searchmagnetlocal.com/qr_barcode_technology.html, Oct. 22, 2010.
Byford, D., "Universal Interactive Device," International Business Machines Corporation, Jun. 1998, 1 page.
Costedio, K., "Bluefly QR Codes Debut on TV," 2 pp. Found online at http://www.barcode.com/Mobile-Barcode-news/bluefly-qr-codes-debut-on-tv.html, Oct. 22, 2010.
First Examination Report from European Patent Office dated May 18, 2015 for EP 11849496.2, 7 pages.

(56) References Cited

OTHER PUBLICATIONS

Examination Search Report from the European Patent Office dated Dec. 4, 2015 for EP 12707418.5, 8 pages.
Extended European Search Report for EP 12152690.9 dated Jun. 19, 2012, 9 pages.
European Office Action for EP 12716751.8 dated Nov. 11, 2015, 4 pages.
Extended European Search Report for EP 11842890.3 dated Mar. 26, 2014, 8 pages.
European Office Action for EP 11842890.3 dated Mar. 13, 2015, 8 pages.
European Office Action for EP 11842890.3 dated May 9, 2016, all pages.
Extended European Search Report for EP 11850819.1 dated Mar. 17, 2014, 5 pages.
Office Action for EP 11850819.1 dated Nov. 12, 2015, 4 pages.
Office Action for EP 12705768.5 dated May 25, 2016, all pages.
Extended European Search Report for EP 11846486 dated Mar. 26, 2014, 5 pages.
Extended European Search Report for EP 11852630 dated Jun. 30, 2014, 7 pages.
Office Action for Korean Patent Application No. 10-2013-7015610 dated Oct. 21, 2016, all pages.
Office Action for Korean Patent Application No. 10-2013-7015610 dated Feb. 21, 2017, all pages.
Office Action from European Patent Office for Application No. 11852630.0 dated May 12, 2015, 7 pages.
European Search Report for EP 11844504 dated Feb. 24, 2015, 10 pages.
European Search Report for EP 11855065 dated Mar. 6, 2014, 6 pages.
Notice of Allowance for Canadian Application 2,818,585 dated Apr. 3, 2017, 1 page.
Notice of Allowance for Canadian Application 2,828,463 dated Apr. 4, 2017, 1 page.
Office Action for CA 2,818,585 dated Nov. 28, 2016, all pages.
Office Action for EP 11811502.1 dated Aug. 29, 2016, all pages.
Office Action for EP 11855065 dated Mar. 13, 2015, 6 pages.
First Office Action by the Mexican Institute of Industrial Property for Mexican Patent Application No. Mx/a/2013/009881 dated Aug. 14, 2014, 3 pages.
Notice of Allowance by the Mexican Institute of Industrial Property for Mexican Patent Application No. Mx/a/2013/009881 dated Jan. 12, 2015, 1 page.
Publication of Brazil appln No. BR 11 2013 012218-8 on Aug. 9, 2016, 1 page.
Gao, J., et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.
International Search Report and Written Opinion of PCT/US2011/059977 dated Mar. 19, 2012, 7 pages.
International Preliminary Report on Patentability of PCT/US2011/059977 dated Jun. 6, 2013, 6 pages.
International Preliminary Report on Patentability of PCT/US2012/048032 dated Apr. 3, 2014, 6 pages.
International Search Report and Written Opinion of PCT/US11/60002 dated Feb. 15, 2012, 7 pages.
International Preliminary Report on Patentability for PCT/US2011/060002 dated Jun. 6, 2013, 6 pages.
International Search Report and Written Opinion of PCT/US11/60094 dated Mar. 30, 2012, 7 pages.
International Preliminary Report on Patentability for PCT/US2011/060094 dated Jun. 20, 2013, 6 pages.
International Search Report and Written Opinion of PCT/US11/60104 dated Mar. 29, 2012, 9 pages.
International Search Report and Written Opinion of PCT/US2011/60121 dated Feb. 14, 2012, 7 pages.
International Preliminary Report on Patentability for PCT/US2011/060121 dated Jun. 20, 2013, 6 pages.
International Search Report and Written Opinion of PCT/US11/61074 dated Jan. 6, 2012, 11 pages.
International Search Report and Written Opinion of PCT/US11/61211 dated Mar. 29, 2012, 8 pages.
International Preliminary Report on Patentability for PCT/US2011/061211 dated Jul. 4, 2013, 7 pages.
International Search Report and Written Opinion of PCT/US11/61773 dated Feb. 21, 2012, 7 pages.
International Preliminary Report on Patentability for PCT/US2011/061773 dated Jun. 6, 2013, 6 pages.
International Search Report and Written Opinion of PCT/US11/61778 dated Mar. 2, 2012, 7 pages.
International Preliminary Report on Patentability for PCT/US2011/061778 dated Jul. 11, 2013, 6 pages.
International Search Report and Written Opinion of PCT/US11/63111 dated Apr. 4, 2012, 9 pages.
International Preliminary Report on Patentability of PCT/US2011/063111 dated Jun. 13, 2013, 8 pages.
International Search Report and Written Opinion of PCT/US2011/064709 dated Apr. 10, 2012, 8 pages.
International Search Report and Written Opinion of PCT/US2011/060098 dated Mar. 29, 2012, 10 pages.
International Preliminary Report on Patentability for PCT/US2011/060098 dated Jun. 13, 2013, 9 pages.
International Search Report and Written Opinion of PCT/US2011/063308 dated Mar. 29, 2012, 10 pages.
International Preliminary Report on Patentability for PCT/US2011/063308 dated Jul. 18, 2013, 9 pages.
International Search Report and Written Opinion of PCT/US2011/068161 dated Jun. 14, 2012, 19 pages.
International Preliminary Report on Patentability of PCT/US2011/068161 dated Jul. 25, 2013, 13 pages.
International Search Report and Written Opinion of PCT/US2011/068176 dated Mar. 29, 2012, 15 pages.
International Search Report and Written Opinion of PCT/US2012/021657 dated May 23, 2012, 12 pages.
International Search Report of PCT/US2012/022581 dated Oct. 8, 2012, 18 pages.
International Preliminary Report on Patentability for PCT/US2012/022581 dated Aug. 8, 2013, 12 pages.
International Search Report and Written Opinion of PCT/US2012/022405 dated Apr. 19, 2012, 11 pages.
International Preliminary Report on Patentability for PCT/US2012/022405 dated Aug. 8, 2013, 7 pages.
International Search Report and Written Opinion of PCT/US2012/024923 dated May 22, 2012, 12 pages.
International Preliminary Report on Patentability for PCT/US2012/024923 dated Aug. 29, 2013, 8 pages.
International Search Report and Written Opinion of PCT/US2012/024956 dated Jun. 11, 2012, 10 pages.
International Preliminary Report on Patentability for PCT/US2012/024956 dated Aug. 29, 2013, 7 pages.
International Search Report and Written Opinion of PCT/US2012/025502 dated Jun. 8, 2012, 13 pages.
International Preliminary Report on Patentability of PCT/US2012/025502 dated Sep. 6, 2013, 9 pages.
International Search Report and Written Opinion of PCT/US2012/025607 dated Jun. 8, 2012, 13 pages.
International Preliminary Report on Patentability for PCT/US2012/025607 dated Sep. 12, 2013, 8 pages.
International Search Report and Written Opinion of PCT/US2012/025634 dated May 7, 2012, 8 pages.
International Preliminary Report on Patentability for PCT/US2012/025634 dated Sep. 6, 2013, 5 pages.
International Search Report and Written Opinion of PCT/US2012/026373 dated Jun. 13, 2012, 14 pages.
International Preliminary Report on Patentability for PCT/US2012/026373 dated Sep. 12, 2013, 10 pages.
International Search Report and Written Opinion of PCT/US2012/026624 dated Aug. 29, 2012, 14 pages.
International Preliminary Report on Patentability for PCT/US2012/026624 dated Sep. 12, 2013, 12 pages.

(56) References Cited

OTHER PUBLICATIONS

International Search Report and Written Opinion of PCT/US2012/026722 dated Jun. 28, 2012, 11 pages.
International Search Report and Written Opinion of PCT/US2012/048032, dated Oct. 16, 2012, 14 pages.
International Search Report and Written Opinion of PCT/US2011/060109 dated Feb. 14, 2012, 7 pages.
International Preliminary Report on Patentability for PCT/US2011/060109 dated Jun. 20, 2013, 7 pages.
First Examination Report from European Patent Office dated Feb. 4, 2015 for EP 12716751.8, 4 pages.
First Office Action for CN 201180065044.7 dated Feb. 13, 2015 by the State Intellectual Property Office (SIPO), 4 pages.
First Office Action with Search Report for CN 201280013891.3 dated Jan. 15, 2016, 13 pages.
Second Office Action CN 201280013891.3 dated Aug. 12, 2016, all pages.
Second Office Action for CN 201180065044.7 dated Sep. 9, 2015 by the State Intellectual Property Office (SIPO), 23 pages.
Office Action from European Patent Office for Application No. 12716728.6 dated Feb. 26, 2015, 5 pages.
Notice of Allowance and search report for ROC (Taiwan) Patent Application No. 101106288 received May 29, 2015, 9 pages.
Office Action of the Intellectual Property Office for ROC Patent App. No. 101101486 dated Aug. 5, 2014, 4 pages.
Office Action of the Intellectual Property Office for ROC Patent App. No. 100143194 dated Sep. 23, 2014, 10 pages.
Office Action of the Intellectual Property Office for ROC Patent App. No. 100142978 dated Sep. 23, 2014, 9 pages.
Office Action from State Intellectual Property Office for CN Appln. No. 201180056242.7 received Jun. 17, 2015, 10 pages.
Second Office Action from State Intellectual Property Office for CN Appln. No. 201180056242.7 dated Jan. 26, 2016, all pages.
Third Office Action from State Intellectual Property Office for CN Appln. No. 201180056242.7 dated Jul. 28, 2016, all pages.
First Office Action and Search Report from State Intellectual Property Office for CN Appln. No. 201180064527.5 dated Oct. 23, 2015, 10 pages.
Second Office Action from State Intellectual Property Office for CN Appln. No. 201180064527.5 dated Jun. 12, 2016, all pages.
(Translation) Rejection Decision for CN Appln. No. 201180064527.5 dated Oct. 9, 2016, all pages.
The First Office Action dated Sep. 11, 2014 for Mexican Patent Application No. MX/a/2013/007672 is not translated into English, 2 pages.
The Second Office Action dated Jun. 1, 2015 for Mexican Patent Application No. MX/a/2013/007672 is not translated into English, 2 pages.
Office Action dated Mar. 2, 2017 for KR 10-2013-7020865, all pages.
Notice to Grant received Jun. 9, 2017 for KR 10-2013-7020865, all pages.
Notice of Allowance dated Nov. 10, 2015 for Mexican Patent Application No. MX/a/2013/007672, 1 page.
The First Office Action dated Jul. 13, 2015 for Mexican Patent Application No. MX/a/2013/009791 is not translated into English, 2 pages.
Notice of Allowance for Mexican Patent Application No. MX/a/2013/009791 dated Mar. 15, 2016, 1 page.
Office Action dated Nov. 12, 2014 for Mexican Patent Application No. MX/a/2013/009794, 2 pages.
Office Action dated Oct. 17, 2016 for European Patent Appln. No. 12701638.4, all pages.
Notice of Allowance dated Feb. 18, 2015 for Mexican Patent Application No. MX/a/2013/009794, 1 page.
The First Office Action for Mexican Patent Application No. MX/a/2013/006262 is not translated into English. This document is from prosecution of the corresponding foreign matter for which we do not have a translation, dated Aug. 7, 2014, 2 pages.
Office Action dated Feb. 10, 2015 for Mexican Patent Application No. MX/a/2013/006770, 2 pages.
Office Action dated Feb. 6, 2015 for Mexican Patent Application No. MX/a/2013/006520, 2 pages.
Office Action dated Jan. 28, 2015 for Mexican Patent Application No. MX/a/2013/006973, 9 pages.
Notice of Allowance for Mexican Patent Application No. MX/a/2013/006973 dated Sep. 4, 2015, 1 page.
Office Action dated Dec. 5, 2014 for Mexican Patent Application No. MX/a/2013/009882, 2 pages.
Office Action for European Patent App. 12704473.3 dated Apr. 29, 2016, all pages.
The Second Office Action dated Apr. 22, 2015 for Mexican Patent Application No. MX/a/2013/009883, 2 pages.
Supplementary European Search Report for EP 11843423 completed Mar. 23, 2016, 8 pages.
Supplementary European Search Report for EP 11843045 completed Mar. 31, 2016, all pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8pp-8, XP031887368, DOI: 10.1109/MTAS.2005.207166; ISBN: 978-981-05-4573-4, 8 pages.
Liu, Yue et al., "Recognition of QR code with mobile phones," Control and Decision Conference, 2008. CCDC 2008. Jul. 2-4, 2008, pp. 203, 206.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
Olson, E., "Bar Codes add Detail on Items in TV Ads," New York Times, Sep. 2010, 3 pp. Found online at http:www.nytimes.com/2010/09/27/business/media/27bluefly.html?src=busin, Oct. 22, 2010.
Publication of BR 11 2014 020007-6 A2 on Jun. 20, 2017, 1 page.
Publication of PCT/US2011/059977 by the India Controller General of Patents Designs and Trademarks as India Patent Publication No. 4694/CHENP/2013 A on Sep. 5, 2014, 1 page.
Publication of PCT/US2012/025634 by the India General Patents Designs and Trademarks as India Patent Publication No. 6967/CHENP/2013 A on Aug. 1, 2014, 1 page.
Rekimoto, J., et al., "Augment-able Reality: Situated Communication Through Physical and Digital Spaces," Sony Computer Science Laboratory, 2002, 8 pp. Found online at Citeseer: 10.1.1.20.34[1].pdf, Oct. 22, 2010.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Silverstein, B., "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Smith, L., "QR Barcodes Make History on Global TV," 3 pp. Found online at http://lindsaysmith.com/worlds-first-mobio-mini-telethon/, Oct. 22, 2010.
Yamanari, T., et al., "Electronic Invisible Code Display Unit for Group Work on Reminiscence Therapy," Proceedings of the International MultiConference of Engineers and Computer Scientists 2009, vol. 1, IMECS 2009, Mar. 2009, 6 pp. Retrieved from the Internet: http://citeseerxist.psu.edu/viewdoc/download?doi=10.1.1.145.6904&rep1&type=pdf.
Yang, C., et al., "Embedded Digital Information Integrated by Video-on-Demand System," Proceedings of the Fourth International Conference on Networked Computing and Advanced Information Management, IEEE Computer Society, 2008, 6 pages.
First Office Action including Search Report from the State Intellectual Property Office for CN Patent Appln. No. 201280014034.5 dated Apr. 5, 2016, all pages.
First Office Action and Search Report from the State Intellectual Property Office (SIPO) for CN 201180056249.9 dated Feb. 3, 2016, all pages.
Notice of Decision to Grant for KR 10-2013-7024307 dated Apr. 14, 2017, 2 pages.

(56) References Cited

OTHER PUBLICATIONS

Second Office Action issued by State Intellectual Property Office (SIPO) for CN 201180056249.9 dated Feb. 4, 2017, all pages.
Office Action and Search Report from the State Intellectual Property Office for CN Pat. Appln. No. 201180066584.7 dated Jul. 10, 2015, 12 pages.
Second Office Action issued by State Intellectual Property Office for CN Pat. Appln. No. 201180066584.7 dated Jan. 11, 2016, 5 pages.
Office Action and Search Report for ROC (Taiwan) Patent Application No. 10014870 dated May 7, 2014, issued in the corresponding foreign application, 9 pages.
Office Action for Korean Patent Application No. 10-2013-7020207 dated Dec. 21, 2016, all pages.
Decision to Grant for Korean Patent Application No. 10-2013-7020207 dated Mar. 9, 2017, all pages.
Office Action and Search Report for ROC (Taiwan) Patent Application No. 100149344 dated Jan. 23, 2015, 8 pages.
Search Report for Patent Application ROC (Taiwan) Patent Application No. 100149344 dated Oct. 28, 2015, 1 page.
Office Action and Search Report for ROC (Taiwan) Pat. Appln. No. 101106313, all pages.
Office Action and Search Report for ROC (Taiwan) Patent Application No. 100142966 dated May 27, 2014, 6 pages.
Office Action for European Patent Application No. 12707435.9 dated Mar. 12, 2015, 6 pages.
Office Action for European Patent Application No. 12719817.4 dated Jun. 23, 2014 issued in the corresponding foreign application, 5 pages.
First Office Action for CN 201280010873 dated Mar. 2, 2016, all pages. (no art cited).
Notice of Decision to Grant for CN 201280010873 dated Mar. 25, 2016, all pages. (not in English).
Notice of Allowance for Canadian Application 2,822,214 dated Nov. 28, 2016, 1 page.
U.S. Appl. No. 14/179,336, filed Feb. 12, 2014, Non-Final Office Action dated May 22, 2014, 14 pages.
U.S. Appl. No. 14/179,336, filed Feb. 12, 2014 Final Office Action dated Dec. 1, 2014, 30 pages.
U.S. Appl. No. 14/179,336, filed Feb. 12, 2014 Notice of Allowance dated Feb. 18, 2015, 15 pages.
U.S. Appl. No. 13/302,717, filed Nov. 22, 2011 Non Final Rejection dated Jun. 16, 2016, all pages.
U.S. Appl. No. 13/302,717, filed Nov. 22, 2011 Non Final Rejection dated Dec. 2, 2015, 27 pages.
U.S. Appl. No. 13/302,717, filed Nov. 22, 2011 Final Rejection dated May 8, 2015, 44 pages.
U.S. Appl. No. 13/302,717, filed Nov. 22, 2011 Non-Final Rejection dated Dec. 18, 2014, 71 pages.
U.S. Appl. No. 12/958,073, filed Dec. 1, 2010, Office Action dated Aug. 31, 2012, 12 pages.
U.S. Appl. No. 12/958,073, filed Dec. 1, 2010, Notice of Allowance dated Jan. 17, 2013, 17 pages.
U.S. Appl. No. 12/961,369, filed Dec. 6, 2010, Non-Final Office Action dated Mar. 9, 2012, 17 pages.
U.S. Appl. No. 12/964,478, filed Dec. 9, 2010, Non-Final Office Action dated Mar. 26, 2013, 19 pages.
U.S. Appl. No. 12/964,478, filed Dec. 9, 2010, Final Office Action dated Sep. 16, 2013, 12 pages.
U.S. Appl. No. 12/971,349, filed Dec. 17, 2010, Office Action dated Nov. 10, 2011, 9 pages.
U.S. Appl. No. 12/971,349, filed Dec. 17, 2010, Final Office Action dated Jan. 20, 2012, 10 pages.
U.S. Appl. No. 12/961,369, filed Dec. 6, 2010, Notice of Allowance dated Jul. 16, 2014, 15 pages.
U.S. Appl. No. 12/961,369, filed Dec. 6, 2010, Final Rejection dated Oct. 30, 2012, 17 pages.
U.S. Appl. No. 12/961,369, filed Dec. 6, 2010, Non-Final Office Action dated Mar. 25, 2013, 17 pages.
U.S. Appl. No. 12/961,369, filed Dec. 6, 2010, Non-Final Office Action dated Jul. 12, 2013, 22 pages.
U.S. Appl. No. 12/961,369, filed Dec. 6, 2010, Non-Final Office Action dated Feb. 13, 2014, 21 pages.
U.S. Appl. No. 12/971,349, filed Dec. 7, 2010 ), Notice of Allowance dated Oct. 2, 2013, 24 pages.
U.S. Appl. No. 12/971,349, filed Dec. 7, 2010 ), Final Rejection dated Oct. 24, 2012, 11 pages.
U.S. Appl. No. 12/971,349, filed Dec. 17, 2010, Office Action dated Jul. 16, 2012, 11 pages.
U.S. Appl. No. 12/981,244, filed Dec. 29, 2010, Office Action dated Dec. 21, 2012, 23 pages.
U.S. Appl. No. 12/981,244, filed Dec. 29, 2010, Final Office Action dated Oct. 30, 2013, 10 pages.
U.S. Appl. No. 12/981,244, filed Dec. 29, 2010, Notice of Allowance dated Mar. 25, 2014, 17 pages.
U.S. Appl. No. 12/984,385, filed Jan. 4, 2011, Notice of Allowance dated Nov. 28, 2012, 11 pages.
U.S. Appl. No. 12/984,385, filed Jan. 4, 2011, Office Action dated Jul. 12, 2012, 16 pages.
U.S. Appl. No. 12/986,721, filed Jan. 7, 2011, Office Action dated Mar. 16, 2012, 6 pages.
U.S. Appl. No. 12/986,721, filed Jan. 7, 2011, Notice of Allowance dated Jun. 21, 2012, 7 pages.
U.S. Appl. No. 12/953,227, filed Nov. 23, 2010, Final Office Action dated May 24, 2013, 17 pages.
U.S. Appl. No. 12/953,227, filed Nov. 23, 2010, Office Action dated Oct. 7, 2012, 31 pages.
U.S. Appl. No. 12/953,227, filed Nov. 23, 2010, Non Final Office action dated Mar. 24, 2015, 39 pages.
U.S. Appl. No. 12/953,227, filed Nov. 23, 2010, Final Office Action dated Nov. 6, 2015, 26 pages.
U.S. Appl. No. 12/953,227, filed Nov. 23, 2010, Notice of Allowance dated May 9, 2017, all pages.
U.S. Appl. No. 13/015,382, filed Jan. 27, 2011, Office Action dated Nov. 13, 2012, 7 pages.
U.S. Appl. No. 13/015,382, filed Jan. 27, 2011, Notice of Allowance dated Feb. 22, 2013, 12 pages.
U.S. Appl. No. 13/016,483, filed Jan. 28, 2011 Office Action dated Nov. 2, 2012, 18 pages.
U.S. Appl. No. 13/016,483, filed Jan. 28, 2011 Final Office Action dated Jun. 27, 2013, 13 pages.
U.S. Appl. No. 13/016,483, filed Jan. 28, 2011 Non-Final Office Action dated Nov. 3, 2014, 33 pages.
U.S. Appl. No. 13/016,483, filed Jan. 28, 2011 Final Office Action dated May 13, 2015, 34 pages.
U.S. Appl. No. 13/016,483, filed Jan. 28, 2011 Non-Final Office Action dated Dec. 14, 2015, 27 pages.
U.S. Appl. No. 13/016,483, filed Jan. 28, 2011 Final Office Action dated Jul. 5, 2016, all pages.
U.S. Appl. No. 13/035,474, filed Feb. 25, 2011 Non Final Rejection dated Feb. 17, 2015, 57 pages.
U.S. Appl. No. 12/953,273, filed Nov. 23, 2010, Notice of Allowance, dated Oct. 18, 2012, 11 pages.
U.S. Appl. No. 12/965,645, filed Dec. 10, 2010, Non-Final Office Action, dated Jul. 19, 2013, 20 pages.
U.S. Appl. No. 12/965,645, filed Dec. 10, 2010, Final Office Action, dated Mar. 18, 2014, 24 pages.
U.S. Appl. No. 12/965,645, filed Dec. 10, 2010, Notice of Allowance, dated Jun. 20, 2014, 35 pages.
U.S. Appl. No. 12/973,431, filed Dec. 20, 2010, Non-Final Rejection dated May 15, 2013, 30 pages.
U.S. Appl. No. 12/973,431, filed Dec. 20, 2010, Final Office Action dated Aug. 27, 2013, 11 pages.
U.S. Appl. No. 12/973,431, filed Dec. 20, 2010 Non-Final Rejection dated Dec. 19, 2014, 30 pages.
U.S. Appl. No. 12/973,431, filed Dec. 20, 2010 Notice of Allowance dated May 28, 2015, 20 pages.
U.S. Appl. No. 13/007,317, filed Jan. 14, 2011, Office action dated Dec. 19, 2012, 29 pages.
U.S. Appl. No. 13/010,557, filed Jan. 20, 2011, Final Rejection dated Jan. 16, 2014, 17 pages.
U.S. Appl. No. 13/010,557, filed Jan. 20, 2011, Non-Final Rejection dated Aug. 5, 2013, 17 pages.

(56) References Cited

OTHER PUBLICATIONS

U.S. Appl. No. 13/014,591, Notice of Allowance dated May 24, 2013, 32 pages.
U.S. Appl. No. 13/020,678, filed Feb. 3, 2011, Office Action dated Jul. 30, 2012, 15 pages.
U.S. Appl. No. 13/020,678, filed Feb. 3, 2011, Notice of Allowance dated Jan. 3, 2013, 13 pages.
U.S. Appl. No. 13/007,317, Notice of Allowance dated May 13, 2013, 16 pages.
U.S. Appl. No. 13/028,030, filed Feb. 15, 2011, Office Action dated Jan. 11, 2013, 14 pages.
U.S. Appl. No. 13/028,030, filed Feb. 15, 2011, Final Office Action dated Jul. 11, 2014, 43 pages.
U.S. Appl. No. 13/028,030, filed Feb. 15, 2011, Non-Final Office Action dated Feb. 6, 2015, 56 pages.
U.S. Appl. No. 13/028,030, filed Feb. 15, 2011, Final Office Action dated Jul. 17, 2015, 63 pages.
U.S. Appl. No. 13/031,115, Notice of Allowance dated Apr. 16, 2013, 24 pages.
U.S. Appl. No. 13/034,482, filed Feb. 24, 2011 Notice of Allowance dated Aug. 29, 2014, 45 pages.
U.S. Appl. No. 13/034,482, filed Feb. 24, 2011, Final Office Action dated Apr. 25, 2013, 19 pages.
U.S. Appl. No. 13/034,482, filed Feb. 24, 2011, Office Action dated Oct. 19, 2012, 11 pages.
U.S. Appl. No. 13/035,474, filed Feb. 25, 2011, Office Action dated Oct. 30, 2012, 11 pages.
U.S. Appl. No. 13/035,474, filed Feb. 25, 2011, Final Rejection dated Mar. 29, 2013, 20 pages.
U.S. Appl. No. 13/035,474, filed Feb. 25, 2011, Non Final Rejection dated Mar. 6, 2014, 20 pages.
U.S. Appl. No. 13/035,474, filed Feb. 25, 2011 Final Rejection dated Aug. 27, 2014, 38 pages.
U.S. Appl. No. 13/035,474, filed Feb. 25, 2011 Non Final Rejection dated Sep. 11, 2015, 65 pages.
U.S. Appl. No. 12/960,285, filed Dec. 3, 2010 Non-Final Office Action dated May 14, 2015, 21 pages.
U.S. Appl. No. 12/960,285, filed Dec. 3, 2010 Final Office Action dated Dec. 3, 2014, 19 pages.
U.S. Appl. No. 12/960,285, filed Dec. 3, 2010, Non-Final Office Action dated Jun. 6, 2014, 19 pages.
U.S. Appl. No. 12/960,285, filed Dec. 3, 2010, Final Office Action dated Apr. 18, 2013, 14 pages.
U.S. Appl. No. 12/960,285, filed Dec. 3, 2010, Non-Final Office Action dated Dec. 6, 2012, 17 pages.
U.S. Appl. No. 12/960,285, filed Dec. 3, 2010, Notice of Allowance dated Nov. 18, 2015, 31 pages.
U.S. Appl. No. 13/006,270, filed Jan. 13, 2011, Non-Final Office Action dated Oct. 8, 2013, 20 pages.
U.S. Appl. No. 13/006,270, filed Jan. 13, 2011, Final Office Action dated May 9, 2014, 41 pages.
U.S. Appl. No. 13/006,270, filed Jan. 13, 2011 Non-Final Office Action dated Sep. 12, 2014, 41 pages.
U.S. Appl. No. 13/006,270, filed Jan. 13, 2011, Final Office Action dated Mar. 23, 2014, 51 pages.
U.S. Appl. No. 13/028,030, filed Feb. 15, 2011 Non-Final Office Action dated Dec. 17, 2013, 60 pages.
U.S. Appl. No. 13/035,525, filed Feb. 25, 2011, Office Action dated Jul. 18, 2012, 15 pages.
U.S. Appl. No. 13/035,525, filed Feb. 25, 2011, Final Office Action dated Jan. 31, 2013, 26 pages.
U.S. Appl. No. 13/035,525, filed Feb. 25, 2011, Non-Final Office Action dated May 15, 2013, 15 pages.
U.S. Appl. No. 13/035,525, filed Feb. 25, 2011, Final Office Action dated Sep. 12, 2013, 21 pages.
U.S. Appl. No. 13/037,302, filed Feb. 28, 2011 Office Action dated Mar. 1, 2013, 20 pages.
U.S. Appl. No. 13/037,302, filed Feb. 28, 2011, Final Office Action dated Oct. 16, 2013, 28 pages.
U.S. Appl. No. 13/037,302, filed Feb. 28, 2011, Final Office Action dated May 4, 2015, 54 pages.
U.S. Appl. No. 13/037,302, filed Feb. 28, 2011, Non-Final Office Action dated Jan. 12, 2016, 62 pages.
U.S. Appl. No. 13/037,302, filed Feb. 28, 2011, Final Office Action dated Jul. 12, 2016, all pages.
U.S. Appl. No. 13/037,302, filed Feb. 28, 2011, Notice of Allowance dated Feb. 16, 2017, all pages.
U.S. Appl. No. 13/037,312, filed Feb. 28, 2011, Office Action dated Aug. 15, 2012, 9 pages.
U.S. Appl. No. 13/037,312, filed Feb. 28, 2011, Notice of Allowance dated Jun. 13, 2013, 10 pages.
U.S. Appl. No. 13/037,312, filed Feb. 28, 2011, Final Office Action dated Feb. 28, 2013, 18 pages.
U.S. Appl. No. 13/037,316, filed Feb. 28, 2011, Office Action dated Jan. 30, 2013, 21 pages.
U.S. Appl. No. 13/037,316, filed Feb. 28, 2011, Final Office Action dated Aug. 28, 2013, 13 pages.
U.S. Appl. No. 13/037,333, filed Feb. 28, 2011, Notice of Allowance dated Jan. 18, 2013, 27 pages.
U.S. Appl. No. 13/192,287, filed Jul. 27, 2011, Notice of Allowance dated Dec. 14, 2015, 14 pages.
U.S. Appl. No. 13/192,287, filed Jul. 27, 2011, Final Office Action dated Jan. 28, 2014, 18 pages.
U.S. Appl. No. 13/192,287, filed Jul. 27, 2011, Non Final Office Action dated Jun. 13, 2013, 22 pages.
U.S. Appl. No. 13/673,480, filed Nov. 9, 2012, Office Action dated Jan. 16, 2013, 27 pages.
U.S. Appl. No. 13/673,480, filed Nov. 9, 2012 Final Office Action dated Sep. 9, 2013, 10 pages.
U.S. Appl. No. 13/673,480, filed Nov. 9, 2012 Notice of Allowance dated Nov. 12, 2013, 16 pages.
U.S. Appl. No. 13/475,794, filed May 18, 2012 Non-Final Office Action dated Sep. 18, 2013, 19 pages.
U.S. Appl. No. 13/475,794, filed May 18, 2012 Non-Final Office Action dated Nov. 21, 2014, 33 pages.
U.S. Appl. No. 13/475,794, filed May 18, 2012 Final Office Action dated Jun. 1, 2015, 45 pages.
U.S. Appl. No. 13/475,794, filed May 18, 2012 Non Final Office Action dated Jul. 29, 2016, all pages.
U.S. Appl. No. 13/475,794, filed May 18, 2012 Notice of Allowance dated Jan. 5, 2017, all pages.
U.S. Appl. No. 13/864,474, filed Apr. 17, 2013 Non Final Office Action dated Aug. 11, 2015, 59 pages.
U.S. Appl. No. 13/864,474, filed Apr. 17, 2013 Final Office Action dated Nov. 20, 2015, all pages.
U.S. Appl. No. 13/864,474, filed Apr. 17, 2013 Non Final Office Action dated Mar. 23, 2016, all pages.
U.S. Appl. No. 13/864,474, filed Apr. 17, 2013 Notice of Allowance dated Feb. 16, 2017, all pages.
U.S. Appl. No. 13/968,611, filed Aug. 16, 2013, Notice of Allowance dated May 2, 2014, 40 pages.
U.S. Appl. No. 13/968,611, filed Aug. 16, 2013, Non-Final Office Action dated Jan. 17, 2014, 21 pages.
U.S. Appl. No. 14/852,787, filed Sep. 14, 2015, Non-Final Office Action dated Sep. 14, 2016, all pages.
U.S. Appl. No. 14/852,787, filed Sep. 14, 2015, Final Office Action dated Jan. 13, 2017, all pages.
Third Office Action from State Intellectual Property Office for CN Appln. No. CN 201280013891.3 dated Dec. 30, 2016, all pages.
U.S. Appl. No. 14/852,787, filed Sep. 14, 2015, Non-Final Office Action dated Sep. 3, 2017, all pages.
Office Action for CA 2,818,757 dated Jul. 12, 2017, all pages.
Office Action for CA 2,823,636 dated Jan. 24, 2017, all pages.
Office Action for CA 2,825,414 dated Apr. 3, 2017, all pages.
Office Action for CA 2,825,414 dated Nov. 1, 2017, all pages.
First Examination Report for EP Appln No. 12716110.7 dated Aug. 2, 2017, all pages.
First Office Action for CA Appln No. 2828447 dated Sep. 7, 2017, all pages.
U.S. Appl. No. 15/595,621, filed May 15, 2017 Final Rejection dated Mar. 8, 2018, all pages.

(56) References Cited

OTHER PUBLICATIONS

U.S. Appl. No. 14/852,787, filed Sep. 14, 2015, Notice of Allowance dated Feb. 21, 2018, all pages.
U.S. Appl. No. 15/639,871, filed Jun. 30, 2017, Notice of Allowance dated Mar. 5, 2018, all pages.
Office Action for CA 2,818,757 dated Jun. 13, 2018, all pages.
Examination Report for Indian Appln No. 7734/CHENP/2013 dated Jun. 25, 2018, all pages.
Decision of Rejection for Korean Patent Appln. No. 10-2013-7015610 dated Jun. 27, 2018, all pages.
Office Action for EP 11843423 dated May 22, 2018, all pages.
Office Action for CA 2819146 dated Jan. 15, 2018, all pages.
Office Action for EP 11 846 858.6 dated Feb. 9, 2018, all pages.
Office Action for EP 12707418.5, dated Feb. 28, 2018, all pages.
Office Action for EP 11846486 dated Jan. 5, 2018, all pages.
Office Action for CA 2828447, all pages.

\* cited by examiner

TRACKING USER INTERACTION FROM A RECEIVING DEVICE

CROSS-REFERENCE TO RELATED APPLICATIONS

The present application is a continuation of U.S. patent application Ser. No. 13/302,717, filed Nov. 22, 2011, entitled "Tracking User Interaction from a Receiving Device", which claims priority to U.S. Patent Application No. 61/417,076, filed Nov. 24, 2010, entitled "Tracking User Interaction From a Receiving Device", the contents of each of which are incorporated herein by reference, in their entireties.

TECHNICAL FIELD

Embodiments described herein relate generally to measuring and tracking user interaction with a television receiver, such as a set top box or cable box, and more particularly to tracking and distinguishing between user interactions at different points in time.

BACKGROUND

Interactivity between users and audiovisual content has been increasing for some time. In many cases, interactivity is achieved by having a user call a telephone number displayed as part of the audiovisual content, or access a Web site at an address similarly displayed. Generally, information may be passively displayed and rely on a viewer to acknowledge the information and act on it.

Often, users may misdial a telephone number, mistype a Web address, or the like. Not only do these errors destroy interactivity, but they may cause undesired interactivity. For example, if a viewer misdials a telephone number by a single digit, he or she may cast an undesired vote, as telephone numbers corresponding to voting options may vary only by a single digit.

Even in situations where undesired interactivity is avoided, errors or faulty memory may prevent interaction entirely. By the time a viewer realizes he has made a mistake, the number, Web site, or other interactive information may no longer be displayed.

Accordingly, what is needed is an enhanced ability to track user interaction from a receiving device.

SUMMARY

Generally, embodiments discussed herein permit tracking user interaction with a television receiver, such as a set-top box, cable box, or other electronic device appropriately configured to receive, decode and display audiovisual information. For example, certain embodiments may be configured to track user interaction with a computing device, such as a desktop computer, laptop computer, tablet device, mobile telephone, personal digital assistant and the like. Further, embodiments discussed herein may generally distinguish between user interactions at different points in time and track the time of the various interactions. Such tracking may be accomplished through the use of a matrix code displayed on a display device along with audiovisual content; the matrix code may be captured by a reader device that processes the matrix code to retrieve data embedded therein. The data may be transmitted from the receiving device to a monitoring party who, in turn, may process the data to track user interaction, audience participation, the time at which audiovisual content was viewed and/or stored, and the like.

Certain embodiments may receive an information code as part of, or along with, audiovisual content. The information code may be a two-dimensional code (also referred to as a "matrix barcode") containing various data regarding the audiovisual content, content provider, content recipient, time of transmission, and the like. The information code may be integrated with the audiovisual content or may be sent separately. If integrated, the code is typically part of the video or graphical portion of the content. If sent separately, it may be transmitted as metadata or in a separate data stream associated with the audiovisual content. As one example, if the audiovisual content is transmitted across a satellite network to a set-top box, the information code may be transmitted in a stream having packets tagged with a packet identifier (PID) that indicates the stream and its contents are associated with the audiovisual content. The stream carrying the information code may carry additional data or may be dedicated to the code.

One embodiment may take the form of a method for audience metering, including the operations of: receiving audiovisual content; receiving data relating to the audiovisual content; determining a time; creating an electronic construct from the data relating to the audiovisual content and the time; and displaying the electronic construct with the audiovisual content.

Another embodiment may take the form of a method for tracking a time at which audiovisual content is viewed, including the operations of: receiving the audiovisual content; receiving data related to the audiovisual content; storing the audiovisual content; receiving a command to play the stored audiovisual content; in response to the command, determining a time; and generating an electronic construct containing a data set, the data set including the data related to the audiovisual content and the time; wherein at least one of the electronic construct and the data set is used by a monitoring party to determine the time at which the audiovisual content is replayed.

Still another embodiment may take the form of an apparatus for outputting a data construct including embedded temporal information, comprising: a storage medium operative to store audiovisual content; a processing unit operative to receive a command to replay the audiovisual content from the storage medium; a matrix code module operatively connected to the processing unit, the matrix code module operative to generate a matrix code including a temporal identifier and a content identifier; and an output component operative to display the content and the matrix code.

Yet another embodiment may be a method for tracking content viewing, comprising the operations of: transmitting content across a first network to a receiver; receiving a digital construct associated with the content across a second network; processing the digital construct to obtain a time and an identifier associated with the content; and using the time and identifier to track viewing of the content.

DETAILED DESCRIPTION

I. Introduction

Figure 1:
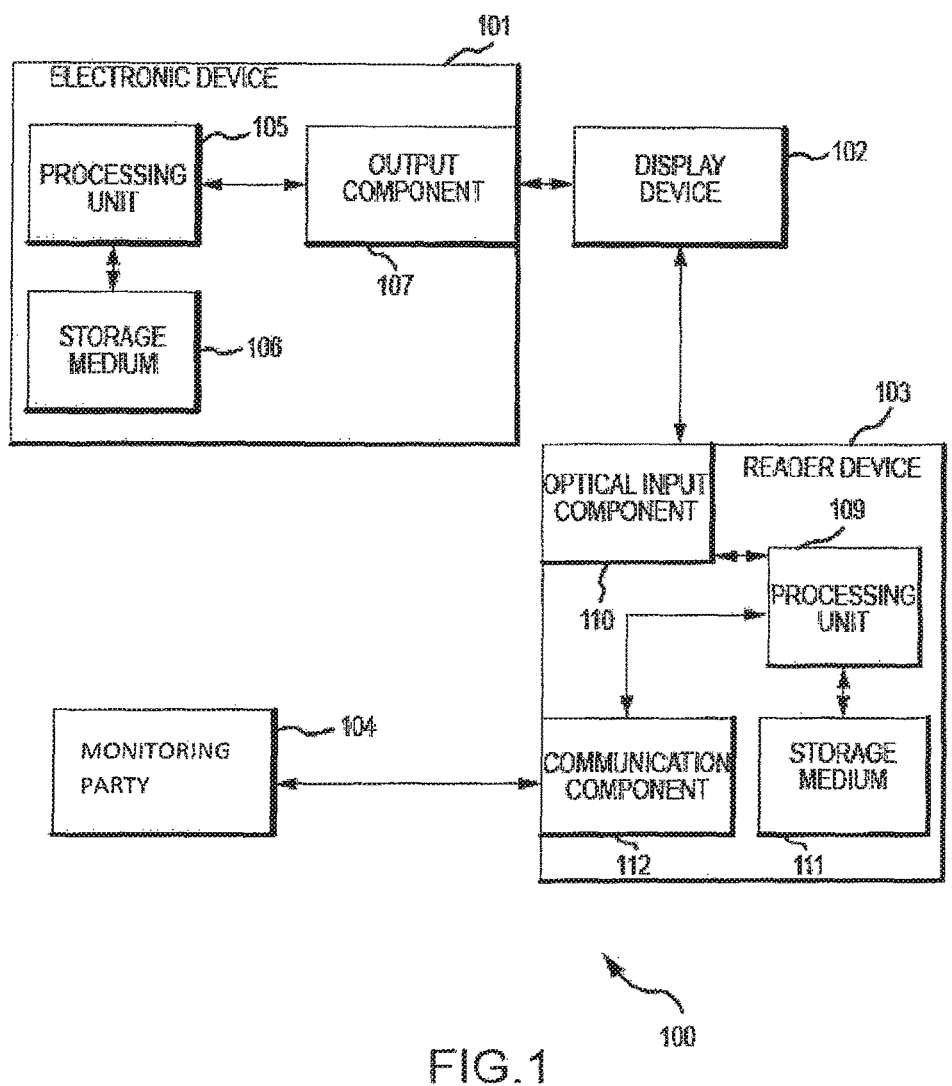
FIG. 1 depicts a sample embodiment in a sample operating environment.

Generally, embodiments discussed herein permit tracking user interaction with a television receiver, such as a set-top box, cable box, or other electronic device appropriately configured to receive, decode and display audiovisual information. For example, certain embodiments may be configured to track user interaction with a computing device, such as a desktop computer, laptop computer, tablet device, mobile telephone, personal digital assistant and the like. Further, embodiments discussed herein may generally distinguish between user interactions at different points in time and track the time of the various interactions.

Certain embodiments may receive an information code as part of, or along with, audiovisual content. The information code may be a two-dimensional code (also referred to as a "matrix barcode") containing various data regarding the audiovisual content, content provider, content recipient, time of transmission, and the like. The information code may be integrated with the audiovisual content or may be sent separately. If integrated, the code is typically part of the video or graphical portion of the content. If sent separately, it may be transmitted as metadata or in a separate data stream associated with the audiovisual content. As one example, if the audiovisual content is transmitted across a satellite network to a set-top box, the information code may be transmitted in a stream having packets tagged with a packet identifier (PID) that indicates the stream and its contents are associated with the audiovisual content. The stream carrying the information code may carry additional data or may be dedicated to the code.

Typically, the code may be overlaid on the video portion of audiovisual content by the television receiver, so that it is displayed in a portion of a display screen associated with the television receiver. Thus, if the receiver obtains the two-dimensional (or "matrix") code in a dedicated PID, it may overlay that code on the video prior to transmitting it to a display. Likewise, if the television receiver obtains metadata or other information from which it may construct a matrix code, the constructed matrix code may be overlaid on video that is then sent to an associated display device.

In several embodiments, the matrix code may contain time and/or date information ("temporal data"). This may be included in the video transmission, as metadata or retrieved by the television receiver and inserted into the matrix code. Typically, although not necessarily, the temporal data includes the date/time on which the audiovisual content was transmitted to the television receiver, the date/time on which the audiovisual content was played by the television receiver, or both. These dates and times may be different, for example, when the television receiver stores the audiovisual content on a storage device such as a hard drive. In such an instance, the temporal data for the transmission of the content may be stored with the content, while temporal data for playback of the content may be added to the matrix code by the television receiver upon playback.

Matrix codes containing temporal data may be used for a variety of purposes, many of which are described herein in more detail. Temporal data may be used to track or limit the timing of voting or audience interaction. As one example, a matrix code may be shown on a display screen during an audience participation segment of an audiovisual program. Watchers may capture an image of the matrix code with a smart phone, digital camera and the like ("reader device") and transmit it across a network to a recipient. The recipient, in turn, may process the matrix code in order to facilitate audience participation.

As one example, many television shows permit a watcher to vote for a favorite television actor, dancer, and the like. A unique matrix code may be presented to viewers for each voting option. The viewer may capture the matrix code corresponding to their desired vote with an appropriately-configured reader device. The matrix code may contain not only the voting information, such as a name or other designation of the person for whom the viewer is voting, but also instructions that may be interpreted by the reader device; such instructions may order the reader device to access a certain web site, Internet location and the like and record the viewer's vote. Alternately, the instructions may facilitate the reader device transmitting the vote through a telephone network, perhaps as a SMS or other text message. Ultimately, data included in the matrix code may be transmitted to a monitoring party who may use that data to study audience participation, voting, viewing habits and so forth. The temporal data in the matrix code may be used by the monitoring party to determine when an audience member watched the audiovisual content, when the audience member replayed the audiovisual content, when the audience member captured an image of the matrix code, and the like. In some embodiments, the matrix code itself may be relayed by the reader device to the monitoring party.

II. System Overview

FIG. 1 is a block diagram illustrating a system 100 for facilitating user participation with audiovisual content through use of a matrix code. The system 100 may include a television receiver 101 (which may be any kind of appropriately-configured electronic device such as a television, a television receiver, a digital video recorder, a digital video disc player, a computing device, a mobile telephone, a video game system, and so on), at least one display device 102 (which may be any kind of display device such as a cathode ray tube display, a liquid crystal display, a television, a computer monitor, and so on), and a reader device 103 (which may be any kind of device capable of detecting and decoding a matrix code such as a telephone equipped with a camera, a mobile computing device that includes a camera, and so on). The system may also include a monitoring party 104.

The television receiver 101 may receive data across a network from a content provider; the content provider may be the same as the monitoring party 104 in certain embodiments. The receiver 101 may include one or more processing units 105, one or more one or more non-transitory storage media 106 (which may take the form of, but is not limited to, a magnetic storage medium; optical storage medium; magneto-optical storage medium; random access memory; erasable programmable memory; flash memory; and so on), and one or more output components 107. The storage medium 106 may store audiovisual content that is received by the television receiver 101 for review at a later time. (The receiver may include various elements, components, hardware and the like that permit it to receive transmitted content, process that content and display it; such components are not shown for purposes of simplicity.) Additionally, although the display device 102 is illustrated as separate from the television receiver, it is understood that in various implementations the display device may be incorporated into the television receiver. The processing unit of the television receiver may execute instructions stored in the non-transitory storage medium to derive information specific to the television receiver that relates to operation of the television receiver, dynamically generate one or more matrix codes (such as one or more QR codes) that include the information specific to the television receiver as well as temporal data related to the date and/or time on which audiovisual content was received and/or played back, and transmit the dynamically generated matrix code to the display device utilizing the output component. Such instructions may take the form of a matrix code module that may be executed by the processor to perform the foregoing functions. Alternately, the matrix code module may be implemented in hardware or firmware.

Subsequently, the reader device 103 may detect the matrix code displayed by the display device 102, decode the data relating to the audiovisual content and any temporal data, and initiate one or more transmissions of such data to the monitoring party 104. The matrix code data may include information such as the audiovisual content being watched, whether such content is being watched live or replayed from storage, a time and/or date on which the content was viewed, an option selected by the viewer, an address to which such information should be transmitted (e.g., an Internet or Web address, a telephone number, and so on), information identifying the viewer (a unique code associated with the viewer and/or the television receiver, such as a serial number, a viewer email address or physical address, a viewer telephone number and so on) and the like. It should be appreciated that different embodiments may vary the information contained in the matrix code and accessed by the reader device. Typically, the matrix code includes data that instructs the reader device 103 how to initiate a transmission to the monitoring party, as well as the data to be transmitted to the monitoring party. It should be appreciated that not all of the foregoing information is necessarily included in a matrix code. Likewise, the foregoing list should be considered examples of suitable information to be included in a matrix code as opposed to an exhaustive list. Further, the information included in any given matrix code may vary depending on whether the code is generated by a content provider or other third party and embedded in video, or is generated by the television receiver.

The reader device may include one or more processing units 109 which execute instructions stored in one or more non-transitory storage media 111 in order to perform the above described functions. The reader device may also include an optical input device 110 (such as a camera, a barcode scanner, and so on) for detecting the matrix code displayed by the display device as well as a communication component 112 for communicating with the monitoring party.

In some implementations, the television receiver 101 may dynamically generate the matrix codes upon a viewer (e.g., user) viewing audiovisual content either in a live fashion or during playback from a storage device. Matrix codes may be generated from metadata or other data transmitted with, or as part of, the audiovisual content. The television receiver 101 may use such data to create the matrix code and overlay it on a video stream prior to transmitting the video stream to the display device. In this manner, a viewer perceives the matrix code generated by the television receiver as part of the audiovisual content experience. If the television receiver 101 creates the matrix code, it may include temporal data therein.

Alternatively, the television receiver 101 may transmit the one or more matrix codes by themselves to the display device 102 via the output component 107 for the display device to display only the one or more matrix codes when the audiovisual content is selected for viewing.

III. Audience Metering and Participation

A time encoded matrix code may be useful for audience metering and/or participation. Such matrix codes may be used when voting (for example, for a contestant on a reality show), as an indication of support for a particular measure or point of view (for example, during debates on news channels), when selecting from among competing products (for example, during competitive advertising soliciting viewer feedback) and in many other instances.

As a general example, consider a reality show that permits viewers to vote for or otherwise support contestants. Rather than calling a telephone number or sending a text message, embodiments discussed herein may permit audience participation by displaying a matrix code that may be captured by a viewer. The matrix code may instruct the receiving device to transmit data included in the code to a monitoring party for registration as a vote for a particular contestant.

In one embodiment, a number of different matrix codes may be shown during display of audiovisual content, each of which may contain different data. In the reality show voting example, the matrix code data may encode the name of each contestant. At different intervals during the audiovisual content, a matrix code encoding the name of each contestant may be shown. A viewer may capture the matrix code associated with the contestant the viewer desires to support. The data therein may be transmitted to the monitoring party by the reader device 103 and registered as a vote for the particular contestant.

Alternately, the matrix codes may omit any information identifying a particular contestant (or option, choice, participation information and the like). Instead, a series of matrix codes may be displayed, each varying from the other codes by having different temporal data encoded therein. For example, a matrix code may encode the time at which it is displayed on the screen. The matrix code may be overlaid, integrated with or otherwise displayed with audiovisual content that identifies a particular option for which an audience member may vote. The member may capture the matrix code with a reader device 103 as previously described, and transmit the data in the code to the monitoring party 104. Since the monitoring party receives the temporal data indicating when the matrix code was displayed and/or captured, it needs only match the timestamp of the temporal data to a window of time during which an option was displayed. Each option may have a different window of time associated with it, which generally reflects the time during which the corresponding matrix code was displayed. Accordingly, if the time the matrix code was captured is known, the option supported by the viewer may be determined.

Figure 2:
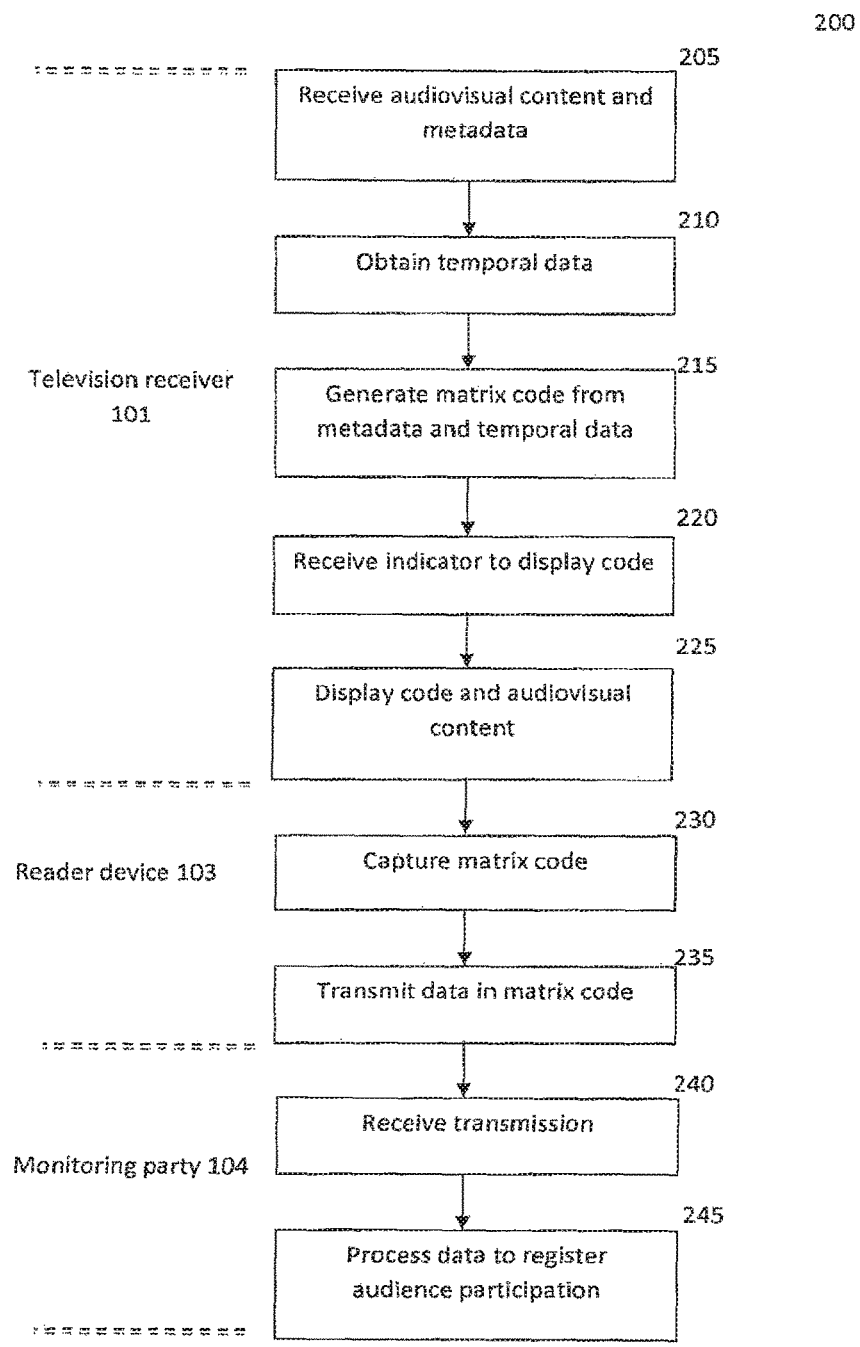
FIG. 2 is a flowchart depicting a sample method of operation for generating, capturing and processing a matrix code in order to measure audience metrics and/or participation.

FIG. 2 is a flowchart depicting a sample method of operation for generating, capturing and processing a matrix code in order to measure audience metrics and/or participation. It should be appreciated that the flowchart of FIG. 2 is an overview of a general method in which individual operations may be performed by different entities or elements. In the instant flowchart, operations 205-225 are typically performed by the television receiver 101, operation 230-235 are typically performed by the reader device 103 and operations 240-245 are typically performed by the monitoring party 104. The activities of multiple entities or elements are shown in a single flowchart to provide an overview of the method that is generalized and easy to follow.

Initially, the method 200 begins in operation 205, in which the television receiver 101 receives audiovisual content and data associated with the content. The data, which may be metadata, may be used by the television receiver to construct a matrix code for display in conjunction with the audiovisual content. In operation 210, the receiver may obtain temporal data. Typically, this temporal data is the time at which the audiovisual content is to be display or when it is received (presuming the content is displayed at substantially the same time it is received).

In operation 215, the television receiver may generate a matrix code from the data received in operation 205 and the temporal data retrieved in operation 210. Thus, the matrix code typically includes the temporal data although in some embodiments it may be omitted. It may also include data identifying the audiovisual content and/or a viewer/user/receiver (such as a receiver number or subscriber number). In some embodiments, geographic data identifying a region or area in which the viewer/receiver is located may be included, as well. If data is omitted, then operation 210 may be skipped.

In operation 220, the television receiver receives an indicator that the matrix code is to be displayed. Accordingly, in operation 225, the receiver outputs the code and audiovisual content. Typically the code and content are outputted together, but in some embodiments they may be outputted serially for display. It should also be appreciated that operations 205-225 may be repeated multiple times so that multiple matrix codes, each with different temporal data, may be created and outputted at the appropriate time. Thus, as the audiovisual content continues to be displayed, a series of matrix codes may likewise be displayed, each of which relates to a segment of the overall content.

In operation 230, the reader device 103 may capture the matrix code from the associated display 102. The matrix code may be deciphered and data therein processed by the reader device, after which at least a portion of the data stored in the code may be transmitted to the monitoring party 104 in operation 235. (As part of the data in the matrix code is typically a Web address or other means of establishing a transmission link to the monitoring party 104, this portion of the matrix code data may be omitted and not transmitted to the monitoring party.) The data transmitted in operation 235 typically, although not necessarily, includes the temporal data. The transmitted data may also include geographical data, data identifying content, data identifying a user or receiver, and the like. Further, the reader device 103 may add this information to the transmitted data, if it was not included in the matrix code.

In operation 240, the monitoring party 104 may receive the data from the receive device 103. Next, in operation 245 the monitoring party may process the data and register the viewer's participation/vote/preference/input accordingly.

IV. Replay Monitoring

As discussed above, embodiments may receive a matrix code as part of, or associated with, reception of audiovisual content. In some cases the audiovisual content may be stored for later viewing or interaction. When content is stored, the associated matrix code (or data used to generate a matrix code) may likewise be stored.

Upon playback of stored audiovisual content, it may be useful to update temporal data in the associated matrix code. For example, it may be useful to determine if the date on which a user votes or otherwise participates in an interactive audience metering session is past a cutoff date for participation. This may be done by updating the temporal data associated with, or embodied in, the matrix code with the time and/or date on which stored content is played back. Thus, the information sent to the monitoring party via the reader device 103 may reflect the playback date, rather than the recording or receipt date. This permits the monitoring party to use the temporal data in any fashion it desires. As one example, it may disregard audience participation information transmitted with the temporal data if the temporal data is later than a cutoff date or time. As another option, audience participation information may be weighted such that information captured at a certain time, as indicated by the temporal data, may be more or less heavily considered by the monitoring party 104. As still another example, the audience participation information may be an indication of what audiovisual content was viewed and by whom it was viewed, similar to the NIELSEN audience measurement system used to determine the audience size and composition for television programming. By including temporal data in the matrix code (and thus ultimately transmitting that temporal data to the monitoring party), it can be determined how long after storing audiovisual content that the content is viewed.

Still other embodiments may use temporal data to open or close windows of opportunity for viewers, and permit viewers to participate in these windows by relaying data in a matrix code displayed on the display. As one example, an item may be placed on sale for a specific period of time that is longer than the duration of a live broadcast. If a viewer captures the matrix code shown during replay of the content and within the period, he or she may qualify for the sale. This qualification may be tracked through the temporal data in the matrix code. Similar methodologies may be used for contests, prize qualifications, and so forth.

In alternative embodiments, the television receiver 101 may omit temporal data from any matrix code it generates for display. Instead, the receiver 101 may include a counter indicating how many times a particular piece of audiovisual content has been played back. A user capturing the matrix code and transmitting it to a monitoring party may thus indicate the number of times the content has been viewed. This may be useful in determining a viewer's tastes and/or preferences. It may also be useful in determining how long (e.g., how many replays) it takes for a user to respond to a matrix code-enabled offer. Some embodiments may include both temporal information and a counter for audiovisual content in a single matrix code.

Figure 3:
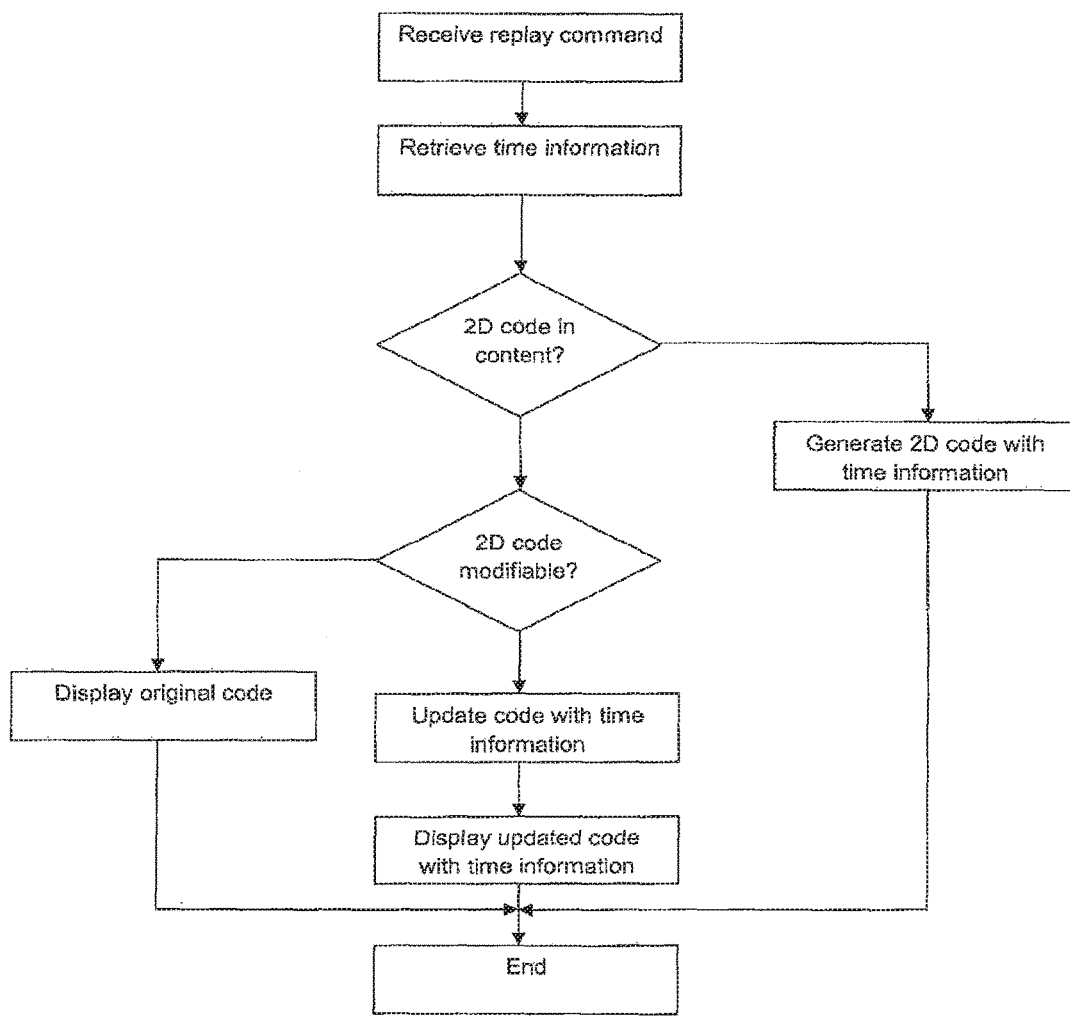
FIG. 3 is a flowchart depicting a sample method of operation for a television receiver to generate and display a matrix barcode having temporal and/or replay data included therein.

Generally, then, it may be useful to modify a matrix code upon playback of stored audiovisual content. FIG. 3 depicts a sample method for such modification. The method 300 begins in operation 305, where a replay command is received by the television receiver 101. Typically, such a command is initiated by a user. Next, in operation 310 the television receiver 101 retries the current time and/or date information.

In operation 315, the television receiver 101 determines if a matrix code is present in the audiovisual content as stored. That is, the receiver determines if the matrix code is a portion of the video signal or is to be overlaid on a video signal. If the code is not a portion of the video signal, the television receiver may execute operation 320 and generate a matrix code having temporal and/or replay counter data therein from metadata or other data stored and associated with the audiovisual content. Following operation 320 the process continues to operation 340 as described below.

If the matrix code is included in the audiovisual content, operation 325 is executed. In operation 325, the television receiver determines if the matrix code can be modified. The code may be modified, for example, if it may be stripped from the video or an overlay can be generated to be placed atop all or part of the matrix code as necessary. If the code cannot be modified, then the original, unmodified matrix code is displayed along with the audiovisual content in operation 330.

If the matrix code can be modified, it is updated with temporal and/or replay counter data in operation 335. Next, in operation 340, the updated code is displayed along with the audiovisual content.

Following either operation 330 or 340, the process ends in end state 345.

The matrix code containing temporal and/or replay data may be captured by a reader device 103 and transmitted to a monitoring party as described above during either operation 330 or 340, as appropriate.

V. Conclusion

Although the foregoing has been described with respect to particular physical structures, methods or operation and data structures, it should be appreciated that alternatives to any of these exist and are embraced within the scope of this disclosure. As one example, a linear bar code may be used in place of a matrix code. As another example, data relating to multiple captured matrix codes may be stored by the reader device 103 and transmitted in a burst fashion rather than serially and as captured. Accordingly, the proper scope of protection is set forth in the following claims.

We claim:

1. An apparatus for outputting a data construct including embedded temporal information, the apparatus comprising:
a storage medium operative to store audiovisual content that the apparatus receives via a first network at a first time, the audiovisual content corresponding to television content;
a processing unit operative to receive a command to replay the audiovisual content from the storage medium;
a matrix code module operatively connected to the processing unit, the matrix code module operative to generate a matrix code including a temporal identifier and a content identifier corresponding to the audiovisual content; and
an output component operative to output, in response to the command to replay the audiovisual content, the audiovisual content and the matrix code for display at a second time with the matrix code overlaid on the audiovisual content;
wherein the matrix code specifies whether the audiovisual content is displayed live or as a replay after being stored in the storage medium and, consequent to the audiovisual content being replayed, the matrix code, including the temporal identifier, specifies the second time at which the audiovisual content is replayed.

2. The apparatus of claim 1, wherein the first time corresponds to a broadcast time of the audiovisual content, the second time is subsequent to the broadcast time, and the matrix code, including the temporal identifier, further specifies a date on which the audiovisual content was replayed.

3. The apparatus of claim 2, wherein the matrix code further includes information corresponding to one or a combination of:
the first time at which the audiovisual content was received by the apparatus;
data identifying a viewer; and/or
a geographic identifier corresponding to a geographic locale at which the audiovisual content is replayed.

4. The apparatus of claim 3, wherein the matrix code further includes an Internet address to which the information should be transmitted via a second network.

5. The apparatus of claim 4, wherein the information is indicative of a vote cast by the viewer.

6. The apparatus of claim 4, wherein:
the processing unit is further operative to receive a subsequent command to replay the audiovisual content at a third time subsequent to the second time; and
the matrix code module is further operative to, upon subsequent replay of the audiovisual content, regenerate the matrix code to update the matrix code to further include a number of times the audiovisual content has been output for display.

7. The apparatus of claim 4, wherein:
the matrix code module operative to generate a series of matrix codes each having different temporal identifiers corresponding to different time windows during replay of the audiovisual content, wherein the series of matrix codes comprises the matrix code; and
the output component is further operative to output the audiovisual content and the series of matrix codes audiovisual content for display with the series of matrix codes overlaid on the audiovisual content.

8. A method for outputting a data construct including embedded temporal information, the method comprising:
receiving, by a television receiver, audiovisual content via a first network at a first time, the audiovisual content corresponding to television content;
storing, by the television receiver, the audiovisual content in a storage medium;
receiving, by the television receiver, a command to replay the audiovisual content from the storage medium;
generating, by the television receiver, a matrix code including a temporal identifier and a content identifier corresponding to the audiovisual content;
in response to the command to replay the audiovisual content, outputting, by the television receiver, the audiovisual content and the matrix code for display at a second time with the matrix code overlaid on the audiovisual content;
wherein the matrix code specifies whether the audiovisual content is displayed live or as a replay after being stored in the storage medium and, consequent to the audiovisual content being replayed, the matrix code, including the temporal identifier, specifies the second time at which the audiovisual content is replayed.

9. The method of claim 8, wherein the first time corresponds to a broadcast time of the audiovisual content, the second time is subsequent to the broadcast time, and the matrix code, including the temporal identifier, further specifies a date on which the audiovisual content was replayed.

10. The method of claim 9, wherein the matrix code further includes information corresponding to one or a combination of:
the first time at which the audiovisual content was received by the television receiver;
data identifying a viewer; and/or
a geographic identifier corresponding to a geographic locale at which the audiovisual content is replayed.

11. The method of claim 10, wherein the matrix code further includes an Internet address to which the information should be transmitted via a second network.

12. The method of claim 11, wherein the information is indicative of a vote cast by the viewer.

13. The method of claim 11, further comprising:
receiving, by the television receiver, a subsequent command to replay the audiovisual content at a third time subsequent to the second time;
upon subsequent replay of the audiovisual content, regenerating, by the television receiver, the matrix code to update the matrix code to further include a number of times the audiovisual content has been output for display.

14. The method of claim 11, further comprising:
generating, by the television receiver, a series of matrix codes each having different temporal identifiers corresponding to different time windows during replay of the audiovisual content, wherein the series of matrix codes comprises the matrix code; and
outputting, by the television receiver, the audiovisual content and the series of matrix codes audiovisual content for display with the series of matrix codes overlaid on the audiovisual content.

15. One or more non-transitory, machine-readable storage media having machine-readable instructions for outputting a data construct including embedded temporal information the machine-readable instructions to cause one or more processors to perform:
processing audiovisual content via a first network at a first time, the audiovisual content corresponding to television content;
storing the audiovisual content in a storage medium;
processing a command to replay the audiovisual content from the storage medium;
generating a matrix code including a temporal identifier and a content identifier corresponding to the audiovisual content;
in response to the command to replay the audiovisual content, causing output of the audiovisual content and the matrix code for display at a second time with the matrix code overlaid on the audiovisual content;
wherein the matrix code specifies whether the audiovisual content is displayed live or as a replay after being stored in the storage medium and, consequent to the audiovisual content being replayed, the matrix code, including the temporal identifier, specifies the second time at which the audiovisual content is replayed.

16. The one or more non-transitory, machine-readable storage media of claim 15, wherein the first time corresponds to a broadcast time of the audiovisual content, the second time is subsequent to the broadcast time, and the matrix code, including the temporal identifier, further specifies a date on which the audiovisual content was replayed.

17. The one or more non-transitory, machine-readable storage media of claim 16, wherein the matrix code further includes information corresponding to one or a combination of:
the first time at which the audiovisual content was received by the one or more processors;
data identifying a viewer;
a geographic identifier corresponding to a geographic locale at which the audiovisual content is replayed; and/or
an Internet address to which the information should be transmitted via a second network.

18. The one or more non-transitory, machine-readable storage media of claim 17, wherein the information is indicative of a vote cast by the viewer.

19. The one or more non-transitory, machine-readable storage media of claim 17, the machine-readable instructions to further cause one or more processors to perform:
processing a subsequent command to replay the audiovisual content at a third time subsequent to the second time;
upon subsequent replay of the audiovisual content, regenerating the matrix code to update the matrix code to further include a number of times the audiovisual content has been output for display.

20. The one or more non-transitory, machine-readable storage media of claim 17, the machine-readable instructions to further cause one or more processors to perform:
generating a series of matrix codes each having different temporal identifiers corresponding to different time windows during replay of the audiovisual content, wherein the series of matrix codes comprises the matrix code; and
causing output of the audiovisual content and the series of matrix codes audiovisual content for display with the series of matrix codes overlaid on the audiovisual content.

* * * * *